United States Patent Office 3,759,693
Patented Sept. 18, 1973

3,759,693
METHOD OF PRODUCING REDUCED IRON ORE PELLETS
Kazuo Kunii, Kobe, Reijiro Nishida, Amagasaki, Thoru Tanimura, Kobe, Masaji Kitamura, Nishinomiya, and Shinya Okamoto, Kobe, Japan, assignors to Kobe Steel, Ltd., Kobe-shi, Japan
Filed Aug. 5, 1970, Ser. No. 61,324
Claims priority, application Japan, Aug. 18, 1969, 44/65,227
Int. Cl. C21b 1/08, 13/00, 13/08
U.S. Cl. 75—3
4 Claims

ABSTRACT OF THE DISCLOSURE

Reduced iron ore pellets have been produced by a method which combines the use of internal and external solid reductants, and is carried out in conjunction with a grate kiln process. Green pellets which are globules of fine ground ore, binders, and internally applied solid reductants, are pelletized. These pellets are preheated and hardened on a travelling grate using waste gases from a rotary kiln. The preheated and hardened pellets are discharged into the rotary kiln and external solid reductants are simultaneously charged, so that the pellets may be subjected to the combined action of the internally and externally applied solid reductants. The pellets have good physical properties and sufficiently high crushing strength to permit them to withstand destructive and abrasive actions to which they are subjected during operation. The present method is economically effective to produce highly metallized pellets on a mass production basis.

ore and granular coal are fed into a rotary kiln. This method is referred to as an extenal use of solid reductants. The former method is more advantageous than the latter method in being more efficient and having a higher rate of reduction of ore and a lower reductant consumption.

However, the internal use of solid reductant is not without disadvantages. For example, if no attempt is made to maintain a reducing or neutral atmosphere in the kiln when the amount of internally applied reductant has been (consumed, in other words in the later stages of reduction of the pellets) the reduced pellets may undergo re-oxidation.

In order to obviate this disadvantage of the internal use of solid reductants, proposals have been made to use a combination of internal and external solid reductants in combination. This method is referred to as a combined use of solid reductants. This method has the most advantages as a method of reduced pellets production by solid reductants. Because the reduction of pellets takes place simultaneously from within and without the pellets, the problem of adjusting the atmosphere at the discharge end of the kiln is obviated by the action of the externally applied reductants. The advantages of the combined use of reductant which forms the subject matter of this invention, can be clearly seen from Table 1 which shows, in comparison, the results of experiments on the three methods.

TABLE 1

| Method of the use of reductants | Oxidized pellets tested, gm. | External reductant, gm. of coke | Internal reductant, gm. of coke | Degree of metallization of reduced pellets, percent | Reductant consumption per unit weight of metallic iron (C/MFI) |
|---|---|---|---|---|---|
| External | 500 | 200 | | 18.4 | 0.41 |
| Internal | 500 | | 50 | 30.0 | 0.24 |
| Combined 1 | 500 | 100 | 50 | 49.4 | 0.21 |
| Combined 2 | 500 | 200 | 50 | 64.9 | 0.24 |

NOTE. Conditions of reduction—(Room temperature to 1,100° C.)×30 min. plus 1,100° C.×20 min.

BACKGROUND OF THE INVENTION

In one method known in the art, iron ore and coal fines are mixed together and the mixture is pelletized. Solid reductants are used as the reducing agents. This method is called an internal use of solid reductant. In another method known in the art, green pellets, fired pellets, lump The production of iron ore pellets using internally applied reductants only have the disadvantage that they are much lower in strength than ordinary iron ore pellets containing no reductant because of the internally applied reductant has little or no effect in uniting or binding together the constituent particles of the pellets. Thus, the use of the iron ore pellets containing internal reductants is liable to suffer poorly under abrasive forces and tend to disintegrate during the rotary kiln process in which the pellets are subjected to a rotating motion or during the shaft process wherein an additional load is applied to the pellets. In order to obviate this problem, the strength of the pellets must be increased or some other reducing process must be adopted. Increase the strength of iron ore pellets containing an internally applied reductant the use of either a large amount of binding agent or a decrease in the amount of the internally applied reductant, is required. These provisions, however, may render the use of internal solid reductants commercially unacceptable and, moreover, may diminish the otherwise inherent advantages of that method.

Processes for effecting reduction of pellets which do not involve the dynamic condition of this sort include the travelling grate process and the rotary hearth process. The former method has the disadvantage however, that the material of the grate makes it very difficult to maintain the grate at a high reducing temperature over a prolonged period of time. This renders this process unsuitable for providing highly metalized pellets. On the other hand although, the latter method does not suffer from this problem because the hearth used is made of a refractory material nevertheless the rotary hearth process poses a problem in that it cannot be used.

SUMMARY OF THE INVENTION

This invention relates to methods of producing reduced iron ore pellets. More particularly, this invention is concerned with a method of producing of reduced iron ore pellets which uses both internal and external solid reductants in combination with a grate kiln process.

The method according to this invention obviates the disadvantages of the reduced pellets production methods of the prior art which uses either internal of or external solid reductants. Therefore the method according to this invention permits a markedly increased, thermal and reduction efficiencies to produce, on a mass production scale basis, reduced iron ore pellets of a high degree of metallization with good physical properties. Moreover, the method according to this invention permits a reduction in production cost of the above described pellets and a reduction in the costs of installation involved in carrying the method.

According to this invention, there is provided a method of producing reduced iron ore pellets characterized by mixing fine ground solid reductants and iron ores containing binders pelletizing the mixture into green pellets, preheating and hardening the green pellets by successive drying and preheating on a travelling grate by the use of waste gases from a rotary kiln, as a heat source, under suitable conditions such that consumption of the internally applied reductants does not occur, discharging the preheated and hardened pellets into said rotary kiln together with preheated externally applied solid reductants introduced into the rotary kiln through the junction of the travelling grate and rotary kiln, and reducing said pellets by the combined reducing action of the internally applied reductant and the externally applied reductants in the rotary kiln to thereby produce reduced iron ore pellets.

DETAILED DESCRIPTION OF PREFERRED EMBODIMENTS

Figure 1:
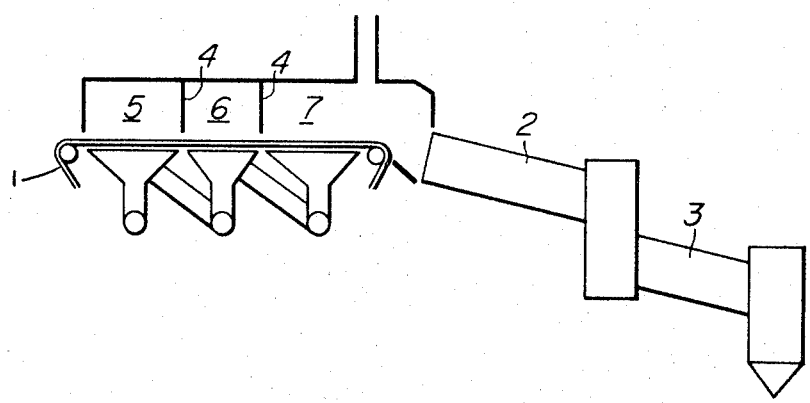
FIG. 1 is a schematic view in explanation of a grate kiln process which is used with the methods of this invention.

Before giving a detailed explanation of the invention, we would like to describe a grate kiln process which is used in combination with the methods of this invention. In FIG. 1, the apparatus shown comprises a travelling grate 1, rotary kiln 2 and cooler 3. Disposed above the travelling grate 1 is, for example, a drying zone 5, dehydration zone 6 and preheating zone 7 which are separated from one another by partition walls 4. Green pellets are piled in a stack of suitable height on the travelling grate 1 for movement through the zones 5, 6 and 7 successively in the indicated order. Waste gases, as a heat source for preheating, are supplied from the rotary kiln 2 and passed through the zones 7, 6 and 5 in a direction opposite to the direction of movement of the green pellets on the travelling grate so as to heat the same. The rotary kiln 2 is a conventional rotary furnace of cylindrical shape which is lined with fire bricks and is, in some cases, distributed several shell burners over the length of the kiln. The pellets discharged from the travelling grate 1 are moved from an inlet to an outlet along a gently inclined bottom surface of the rotary kiln 2. Provided at the discharge end of the rotary kiln is a central burner for the kiln which directs a flame in the direction of the inlet, which is provided to reduce the pellets. The reduced and sintered pellets are discharged from the rotary kiln 2 and introduced into the cooler 3 where they are cooled and delivered to the station for the next operation.

(1) Blending and pelletization of raw materials

In the grate kiln process the iron ore pellets containing the internally applied reductant should have sufficient strength to withstand the destructive and abrasive action to which they are subjected when they are placed on the travelling grate and as they are transferred to the kiln after being preheated on the grate. Thus, the pellets should have a crushing strength, on an average, of 2 kg./pe. (crushing strength per pellet expressed in kilograms) in the former step and over 20 kg./pe. in the latter step at room temperature. In order that the pellets may satisfy such physical conditions in the respective steps the green pellets must be prepared with care. Preferably, each green pellet will comprise 10 to 15% by weight of internally applied reductants, such as iron making coke fines or a mixture of iron making coke and coal fines; over 2% bentonite, or other binding agent; and the balance ore fines, such as hematite or magnetite in powder form. Calcium chloride, calcium hydrate, calcium carbonate or a high polymer compound such as pitch, or lignite, may be used as the binding agent. Pitch can serve the dual function of binding agent and reductant.

If the proportion of internally applied reductant is less than 10% by weight, the degree of reduction caused by the action of the reductant in the pellets will be lower than the degree of reduction attributed to the action of the reductants outside the pellets and the method will be more akin to the external use of solid reductant, as can be clearly seen from Table 1 above. On the other hand, if the proportion exceeds 15% by weight, it will be impossible to impart to the pellets sufficiently high strength to withstand the destructive and abrasive actions to which green pellets are subjected when placed on the travelling grate and when moved from the grate to the kiln.

Figure 2:
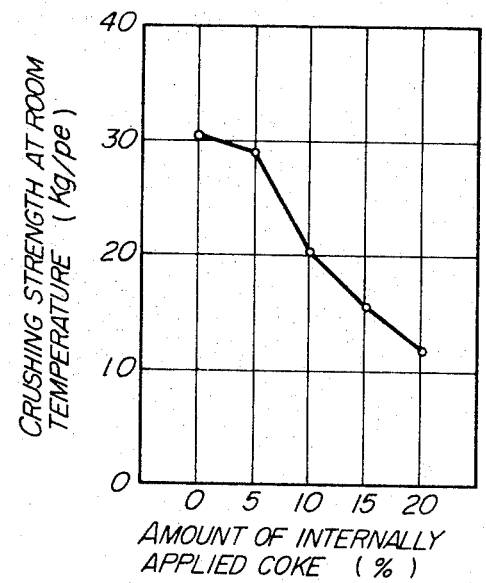
FIG. 2 is a diagram showing the relation between the amount of coke fine used as an internally applied reductant and crushing strength at room temperature of preheated pellets.

FIG. 2 is a diagram showing the relation between the quantity of coke fines used as internally applied reductant, and the crushing strengths at room temperature of preheated magnetite pellets, wherein the diameter of the pellets is 10 mm. and which have been preheated to 1000° C.

It will be evident from FIG. 2 that the amount of internally applied coke fine must be below 15% if preheated pellets are to have crushing strength of 16 to 17 kg./pe. While the present tests were carried out with pellets of 10 mm. diameter it is more economic to use pellets in the range of 12-14 mm. which should have a crushing strength of 20 kg./pe. It has been found that a pellet composition which shows a crushing strength of 16 to 17 kg./pe. in pellets of 10 mm. will exhibit a crushing strength of 20 kg./pe. in pellets of 12-12 mm. Thus to achieve this crushing strength in 12-14 mm. pellets the pellet composition should include less than 15% of internally applied coal fines. This is also true where ores other than magnetite are used.

Table 2 and Table 3 show chemical compositions and grain size distribution of raw materials used in the experiments.

TABLE 2.—CHEMICAL COMPOSITIONS OF RAW MATERIALS (a) Iron ore

| Composition | T. Fe | FeO | $Fe_2O_3$ | $SiO_2$ | $Al_2O_3$ | CaO | MgO | S | C.W. |
|---|---|---|---|---|---|---|---|---|---|
| Indian ore | 60.59 | 0.50 | 86.07 | 4.61 | 3.15 | 0.22 | 0.03 | 0.013 | 4.07 |
| Parabola ore | 65.54 | 24.09 | 66.96 | 0.42 | (.85 | 1.39 | 2.77 | 0.035 | 0.86 |

(b) Coke

| Composition | Fixed carbon | Volatile matter | Sulfur | Ash |
|---|---|---|---|---|
| Coke | 86.11 | 1.49 | 0.52 | 12.40 |

(c) Bentonite

| Composition | $Fe_2O_3$ | $SiO_2$ | $Al_2O_3$ | MgO | CaO | $K_2O$ | $Na_2O$ | Ignition loss |
|---|---|---|---|---|---|---|---|---|
| Bentonite | 2.08 | 72.44 | 11.47 | 1.08 | 3.19 | 0.48 | 2.08 | 6.98 |

TABLE 3.—GRAIN SIZE DISTRIBUTION OF RAW MATERIALS

| | Sieve analysis, percent | | | | | | |
|---|---|---|---|---|---|---|---|
| Grain size (mesh) | +48 | 48 to +65 | −65 to +100 | −100 to +145 | −145 to +200 | −20 to +325 | −325 |
| Indian ore | 0.35 | 1.15 | 3.02 | 5.38 | 7.65 | 11.02 | 71.43 |
| Parabola ore | 0.10 | 0.14 | 0.59 | 0.89 | 5.39 | 20.74 | 72.15 |
| Coke | 0.28 | 0.14 | 1.48 | 5.31 | 11.21 | 15.94 | 65.64 |

Green pellets are pelletized on balling disks from these raw materials with the aid of 7 to 8% water. Table 4 shows one example of the physical properties of green pellets formed as aforementioned.

TABLE 4.—PHYSICAL PROPERTIES OF GREEN PELLETS

Water content _____ 8%.
Porosity _____ 33%.
Degree of filling water _____ 80%.
Apparent density _____ 3.0%.
Crushing strength _____ 3.5 kg./pe.
Modulus of deformation _____ 8%.
Number of drops* withstand _____ 33 times.
Bulk density _____ 1.8 kg./l.

* The number of times pellets are dropped from a height of 500 mm. onto an iron plate before destruction.

(2) Preheating and hardening of green pellets comprising internally applied reductants on the travelling grate Preheating and hardening of green pellets on the travelling grate is generally carried out on the zone system in which there are a drying zone and preheating zone above the grate. It is to be understood that a three zone system which includes a dehydration zone interposed between the drying zone and preheating zone may be adopted depending on the nature of the iron ores treated. The description herein refers to the travelling grate of the three zone system.

Green pellets are placed on the travelling grate in a stack of suitable height, preferably from about 120 to 180 mm., which is moved successively through the drying, dehydration and preheating zones in the indicated order into the rotary kiln. The waste gas from the rotary kiln, which is used for preheating the green pellets, is passed counter-currently to the direction of movement of the green pellets on the travelling grate through the preheating, dehydration and drying zone in the indicated order, and is caused to flow from the upper portion to the lower portion of each zone through the layer of pellets on the travelling grate. The waste gas is ultimately exhausted to the atmosphere. The waste gas must be maintained at 1000° to 1100° C. in the preheating zone, 370° to 400° C. in the dehydration zone, and 230° to 250° C. in the drying zone. When the temperature of waste gas is lower than the indicated ranges, auxiliary burners are required. In the method according to this invention, it is sometimes necessary to use auxiliary burners in the preheating zone and drying zone.

The amount of gas supplied to each zone is optimum when the mass ratio of gas with respect to the pellet (the weight of gas per unit weight of the pellet) is 0.8 to 1.0. The gas supplied to the drying zone and the dehydration zone may have any composition. However, the gas supplied to the preheating zone preferably has an oxygen content of less than 2% so as to inhibit the combustion loss of the internally applied reductants.

When the heating gas is supplied under the aforesaid conditions, the pellets are permitted to stay for 4 to 6 minutes in the drying zone, for 4 to 6 minutes in the dehydration zone, and for 6 to 8 minutes in the preheating zone. Table 5, Table 6 and Table 7 show the preheating and hardening conditions and the properties of preheated pellets in the case of pellets having the compositions and physical properties of Table 2, Table 3 and Table 4.

TABLE 5.—CONDITIONS FOR PREHEATING AND HARDENING

| | Conditions | | |
|---|---|---|---|
| Zone | Temp. of heating gas (° C.) | Amount of heating gas (Nm.³/min.) | Period of time of stay of pellets |
| Drying | 240 | 5 | 5 |
| Dehydration | 380 | 5 | 5 |
| Preheating | 1,100 | 3 | 8 |

NOTE.—Thickness of the stack of pellets=180 mm. Gas composition for preheating zone=$O_2$; 1.5%.

TABLE 6.—TEMPERATURES TO WHICH PELLETS ARE EXPOSED AT THE OUTLET OF EACH ZONE

| Zone | Temperature | | |
|---|---|---|---|
| | Upper layer | Intermediate layer | Lower layer |
| Drying | 210 | 120 | 50 |
| Dehydration | 380 | 350 | 150 |
| Preheating | 1,090 | 980 | 850 |

NOTE.—The upper, intermediate and lower layers are those of the stack of pellets divided into three layers, and the temperature of each layer is obtained in the central portion of each layer.

TABLE 7.—PROPERTIES OF PREHEATED PELLETS

| Layer | Crushing strength (kg./pe.) | Degree of— | |
|---|---|---|---|
| | | Consumption of internal F.C. (percent) | Reduction of iron ore (percent) |
| Upper | 25.8 | 39.1 | 9.2 |
| Intermediate | 30.0 | 17.8 | 4.1 |
| Lower | 29.0 | 9.6 | 0.4 |
| Mean value | 28.3 | 22.2 | 4.6 |

The preheated pellets obtained in the present experiments conducted under the aforementioned conditions have been found to have strength of over 25 kg./pe. on an average, with an average fixed carbon consumption degree of 15 to 25% and an average degree of reduction of iron ore of 4%.

Figure 3:
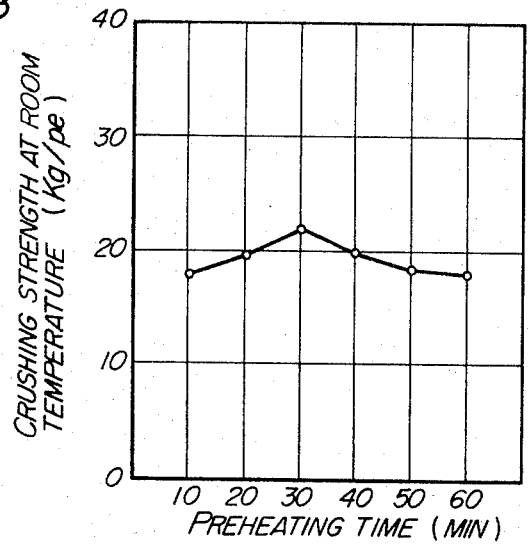
FIG. 3 is a diagram showing the relation between the preheating time and crushing strength at room temperature of preheated pellets.
Figure 4:
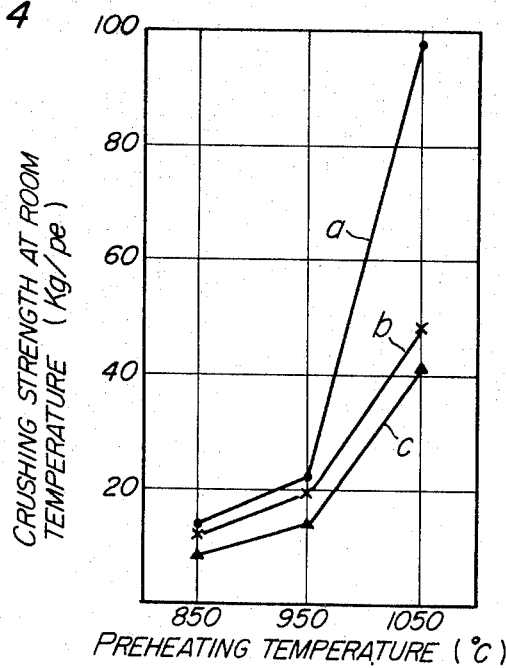
FIG. 4 is a diagram showing the relation between the preheating temperature and crushing strength at room temperature of preheated pellets.

FIG. 3 and FIG. 4 show the influences of preheating time and preheating temperature on the crushing strength at room temperature of the preheated pellets with diameters of 10 mm. FIG. 3 shows the relation between the preheating time and crushing strength at room temperature of pellets comprising hematite ore fines and 10% internally applied coke fines as a reductant, it will be seen from the figure that a variation in preheating time causes a marked change in strength. It will also be seen that an increase in preheating time causes an increase in the combustion loss of internally applied reductant, which is not desirable.

FIG. 4 shows the relation between the preheating temperature and crushing strength at room temperature, of pellets containing hematite ore fines and magnetite ore fines in varying proportions and 10% of coke fines internally as an applied reductant. In the figure, the curve $a$ represents pellets containing hematite and magnetite at a ratio 50:50; the curbe $b$ represents pellets containing hematite and magnetite at a ratio 70:30; and the curve $c$ represents pellets containing hematite and magnetite at a ratio 85:15. It will be seen from the figure that the crushing strength of the pellets will vary markedly depending on the preheating temperature. When the preheating temperature is below 800° C., it is not possible to impart strength of a sufficiently high level to the pellets; when it is over 1100° C., it is not possible to impart strength of a sufficiently high level to the pellets because of the combustion of the internally applied reductants and because of structural destruction of bentonite.

(3) Reduction of preheated pellets in the rotary kiln by the combined action of internally and externally applied reductants An externally applied reductant is added to the preheated pellets containing the internally applied reductant as they are discharged from the travelling grate and introduced into the rotary kiln. The preheated pellets are subjected to the mutual action of the internal and external applied reductants as the rotary kiln rotates, and moved gradually from the inlet to the outlet of the kiln. The externally applied reductant is preferably coal of good reactivity or its secondary product, such as "Char" (trade name), but iron making coke may also be used as the externally applied reductant. In the present invention, "Char" and coke used have a grain size of 5 to 20 mm. and 1 to 8 mm. in diameter respectively, and the amount of externally applied reductants should be in an excess of the theoretically required amount, in order to maintain a reducing atmosphere in the kiln at all times.

Figure 5:
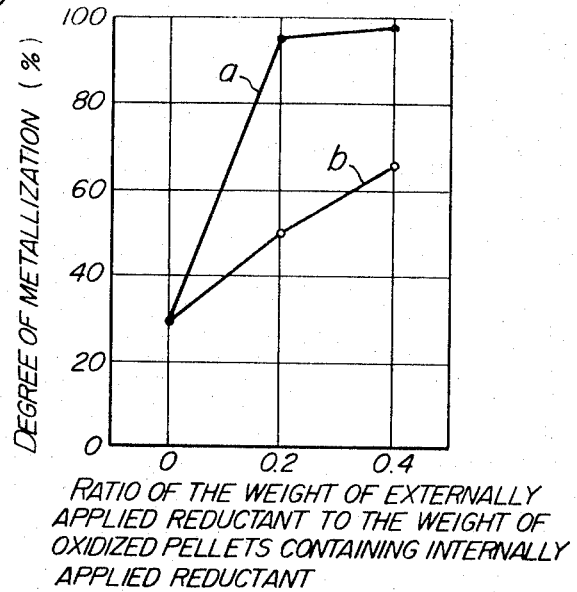
FIG. 5 is a diagram showing the relation between the ratio of an externally applied reductants weight per unit weight of pellets and the degree of metallization of reduced pellets.

FIG. 5 shows the influence of the proportions of "Char" and coke on the reduction of pellets with diameters of 10 mm. when the rotary kiln is maintained at the highest temperature of 1100° C. for 20 minutes. In the figure, the curve $a$ represents pellets applying "Char" and the curve $b$ represents pellets applying coke, with 0 in the amount of externally applied reductants corresponding to the value obtained with the internal use of solid reductants. It will be seen from the figure that, in the case of "Char" which is a reductant of high reactivity, the degree of metallization of the pellets markedly increases and exceeds 95% until the proportion of externally applied reductants reaches 20%, but that a further increase in the proportion of externally applied reductants does not cause any marked increase in the degree of metallization. On the other hand, it will be seen that, in the case of coke, which is a reductant of relatively low reactivity, the degree of metallization is 60 to 80% when the proportion of externally applied reductant is 40%, but the degree of metallization further increases with an increase in the proportion of externally applied reductants. The highest temperature shown in the figure is 1100° C., but if the temperature is increased or the interval of time of the stay of pellets in the kiln is increased it will be possible to further increase the degree of metallization of the pellets. From this observation, it will be appreciated that the optimum proportion ranges of "Char" and coke per unit weight of each pellet discharged from the travelling grate to the rotary kiln is 15 to 20% and 30 to 40%, respectively. In the present invention, the externally applied reductant in the aforesaid ranges of proportions is added to the preheated pellets at the junction of the travelling grate and rotary kiln.

Conditions for reduction of iron ore pellets in the rotary kiln in the present invention are such that the proportion of the charge with respect to the sectional area of the kiln is in a range from 10 to 15% and the reduction temperature is in a range from 1100° to 1200° C. or below the melting point of the pellets. A burner disposed at the discharge end of the rotary kiln for burning heavy oil is used as a heat source to supply heat for effecting reduction.

The rotary kiln is generally divided into two zones, that is a temperature increasing reduction zone and constant temperature reduction zone. In the former, the preheated pellets comprise internally applied reductants in combination with externally applied preheated reductants, which have been introduced into the kiln at the junction of the grate and kiln, are heated to a reducing temperature of about 1100° C., so that the oxides of iron may be reduced to FeO. In the latter, the charge attains the reducing temperature range of 1100° to 1200° C. and the FeO is reduced to metallic iron. At the same time, sintering of the metallic iron particles forming the reduced pellets is expedited.

Figure 6:
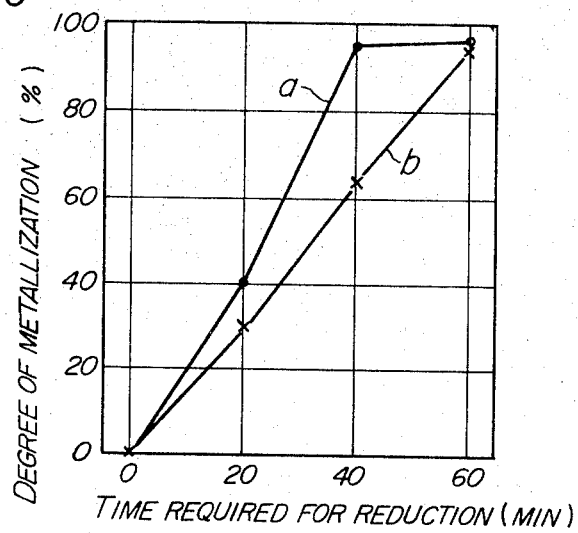
FIG. 6 is a diagram showing the relation between the time required for reduction and the degree of metallization of reduced pellets.

FIG. 6 shows variations in the degree of metallization of pellets with time when the pellets are subjected to reduction under the aforesaid conditions by the combined action of the internally and externally applied reductants. FIG. 6 is a diagram showing the relation between the time required for reduction and degree of metallization of preheated pellets with diameters of 10 mm. reduced at the reducing temperature of 1100° C. by adding thereto externally applied reductants in a proportion 10% by weight. In the figure, the curve $a$ represents pellets to which "Char" is added and the curve $b$ represents pellets to which coke is added. It will be seen from the figure that, when "Char" is used as the externally applied reductant, the time required for the pellets to stay in the rotary kiln, or the time required for reducing the pellets (in other words, achieving the degree of metallization of over 90%) is about 40 minutes, and that, when coke is used, the corresponding time is about 60 minutes. When a mixture of "Char" and coke is used as the externally applied reductants, the corresponding time will be in a range from 40 to 60 minutes.

Table 8 shows the results of tests conducted with the reduced iron ore pellets produced under the aforesaid reducing conditions. In the tests under discussion, the temperature distribution in the constant temperature reduction zone in the kiln was such that the area at 1100° C. accounted for over 95% of the entire areas in the zone.

TABLE 8.—RESULTS OF TESTS ON REDUCED IRON ORE PELLETS

|  | Test number | | |
| --- | --- | --- | --- |
|  | 1 | 2 | 3 |
|  | Kind and proportion (percent) of internal reductant | | |
|  | Coke, 10% | Coke, 7% and "Char", 3% | Coke, 10% |
| Kind of external reductant | "Char" | "Char" | Coke |
| Chemical compositions of reduced pellets (percent): | | | |
| T.Fe | 82.03 | 81.91 | 85.36 |
| M.Fe | 77.41 | 76.12 | 81.17 |
| FeO | 1.67 | 5.39 | 5.03 |
| $Fe_2O_3$ | 4.73 | 2.29 | 0.40 |
| C | 3.07 | 2.41 | 2.33 |
| Degree of metallization (percent) | 94.37 | 92.93 | 95.09 |
| Physical properties of reduced pellets: | | | |
| Porosity (percent) | 62.6 | 64.5 | 62.3 |
| Crushing strength (kg./pe.) | 61.0 | 65.0 | 64.9 |
| Time required for reduction (min.): | | | |
| Increasing temp. reduction zone | 20 | 20 | 20 |
| Constant temp. reduction zone | 20 | 20 | 40 |
| Total | 40 | 40 | 60 |

NOTE.—The values of crushing strength are those for the pellets with diameters of 10 mm.

It will be appreciated from the foregoing description that the present invention resides in carrying into practice, in association with a grate kiln process, the combined use of solid reductants which combines the advantages of a conventional internal solid reductants, with those of a conventional external solid reductants. The invention offers advantages which are summarized as follows:

(1) When the combined use of solid reductants is used, pellets can be reduced at a higher rate than when either conventional internal or external solid reductants are used alone, because the pellets comprised are preheated on the travelling grate by the waste gases from the rotary kiln before they are subjected to the combined reducing action of the internally and externally applied reductants in the rotary kiln. Stated differently, the time required for the pellets to achieve a predetermined degree of metallization is shortest when the combined use of solid reductants is employed. The use of the combined method thus makes it possible to reduce the dimension of the reducing rotary kiln and and at the same time to increase the treating capacity of the kiln;

(2) When the combined use of solid reductant is used, the abrasion and disintegration of pellets which might otherwise occur when they are introduced into the kiln and while they are subjected to the reducing action by the international use of solid reductant can be prevented. The pellets containing internally applied reductants are hardened when preheated on the grate, and the externally applied reductants serves as a buffer against any impact to which the pellets might otherwise be subjected when they impinge on one another or on the inner wall of the kiln. The problem of reoxidation of reduced pellets in the later stages of reduction or while cooling which is encountered when the internal use of solid reductant is used can be obviated by the introduction of externally applied reductant into the rotary kiln in a amount in excess of the amount theoretically required to maintain a strongly reducing atmosphere around the pellets; and (3) In the combined use of solid reductant according to this invention, combustion loss of the internally applied reductants in the preheating step is small because preheating and hardening is effected by rapid heating in a short interval of time, so that the internally applied reductants can achieve satisfactory results in the reducing kiln. The method according to this invention is economical in that coke of the granular size which is relatively low in reactivity and not suitable for use in a blast furnace in an iron making plant can be used as an internally applied reductant after being pulverized. Non-coking coal of low cost and relatively high reactivity or its secondary product such as "Char" (trade name), or coke breeze can be used as internally applied reductants. The use such solid reductants in combination permits the production of many varieties of reduced pellets of iron ore having high degrees of metallization.

As shown in Table 9, the combined use of solid reductant carried into practice in association with the grate kiln process according to the present invention is more advantageous than the rotary hearth method (internal use of solid reductant) or the rotary kiln method (external use of solid reductant) both in the amount of consumption of reductant and the total amount of heat required for the operation.

TABLE 9.—CONSUMPTION OF REDUCTANT AND TOTAL AMOUNT OF HEAT REQUIRED FOR DIFFERENT PRODUCTION PROCESSES

| Process | Method of application | Consumption of reductant (kg./ton reduced pellet) | Fuel | Total amount of heat (Kcal./ ton reduced pellets) |
| --- | --- | --- | --- | --- |
| Conventional process | External | 370 | Heavy oil | $3.5 \times 10_6$ |
| Do | Internal | 330 | Natural gas | $2.9 \times 10$ |
| Process of the present invention | Combined | 310 | Heavy oil | $2.7 \times 10^6$ |

NOTE.—The degree of metallization of reduced pellets is 95%.

As aforementioned, precent invention offers many advantages over methods of the prior art. The invention permits a good and efficient use of heat in the system as a whole and permits the economic production of reduced iron ore pellets of a high degree of metallization on a mass production basis by continuously feeding preheated pellets containing iron making coke fines as an internally applied reductant from the travelling grate to the rotary kiln and subjecting the preheated pellets in the rotary kiln to the combined reducing action of the internally and externally applied reductants.

What we claim is:

1. A method of reducing iron ore characterized by an enhanced degree of metallization and increased thermal and reduction efficiency, said method comprising the steps of mixing the iron ore, a reductant and a suitable binder, pelletizing the mixture in green pellets, preheating and hardening said green pellets by successively drying and rapidly heating to elevated temperatures on a travelling grate by the use of waste gases from a rotary kiln as a heat source, so as to prevent the consumption of said reductant, moving the preheated and hardened pellets to said rotary kiln and admixing with preheated externally applied solid reductant, said externally applied solid reductant being added to said hardened pellets through the junction of the travelling grate and the rotary kiln, and reducing said pellets by the combined reducing action of the reductant within the pellets and the externally applied reductant to thereby produce reduced iron ore pellets, whereby said externally applied reductant serves as a buffer against impact by the pellets in said rotary kiln.

2. A method of producing reduced iron ore pellets as defined in claim 1 in which said green pellets each comprises 10 to 15% by weight internally applied reductants, over 2% bentonite, as a binding agent, and the balance iron ore fines, in powder form.

3. A method of producing reduced iron ore pellets as defined in claim 2 in which said internally applied reductant is iron making coke fines or a mixture of iron making coke fines and pulverized coal fines, and said binding agents are selected from among the group consisting of bentonite, calcium chloride, calcium hydrate, calcium carbonate and high polymer compounds.

4. A method of producing reduced iron ore pellets as defined in claim 2 wherein said high polymer compounds are pitch or lignite.

References Cited
UNITED STATES PATENTS

| | | | |
|---|---|---|---|
| 2,855,290 | 10/1958 | Freeman | 75—3 |
| 2,401,146 | 5/1946 | Eulenstein | 75—40 |
| 2,846,302 | 8/1958 | Greenawaut | 75—40 |
| 2,805,929 | 9/1957 | Udx | 75—11 |
| 3,276,859 | 10/1966 | Collin | 75—11 |
| 3,163,520 | 12/1964 | Collin | 75—11 |
| 2,918,364 | 12/1959 | Lesher | 75—4 |
| 3,258,327 | 6/1966 | Smoot | 75—3 |
| 2,961,411 | 11/1960 | Klugh | 75—4 |
| 3,012,970 | 12/1961 | Banks | 75—4 |

L. DEWAYNE RUTLEDGE, Primary Examiner

P. D. ROSENBERG, Assistant Examiner

U.S. Cl. X.R.

75—34, 35